United States Patent
Lessi et al.

(10) Patent No.: US 6,739,400 B2
(45) Date of Patent: May 25, 2004

(54) PROCESS AND INSTALLATION FOR FIGHTING A FIRE IN AN AIRCRAFT COMPARTMENT AND AIRCRAFT EQUIPPED WITH SUCH AN INSTALLATION

(75) Inventors: Stéphane Lessi, Grenoble (FR); Olivier Vandroux, Grenoble (FR)

(73) Assignee: L'Air Liquide-Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 295 days.

(21) Appl. No.: 10/112,950

(22) Filed: Apr. 2, 2002

(65) Prior Publication Data

US 2002/0139542 A1 Oct. 3, 2002

(30) Foreign Application Priority Data

Apr. 2, 2001 (FR) .............................. 01 04450

(51) Int. Cl.$^7$ .............................. A62C 2/00; A62C 3/00
(52) U.S. Cl. .............................. 169/46; 169/43; 169/44; 169/53; 169/54; 169/56; 169/5; 169/7
(58) Field of Search .............................. 169/43, 44, 46, 169/53, 54, 56, 5, 7, 9, 62

(56) References Cited

U.S. PATENT DOCUMENTS

| 2,934,293 | A | * | 4/1960 | Boehme et al. .......... 244/118.5 |
| 4,807,706 | A | * | 2/1989 | Lambertsen et al. .......... 169/45 |
| 5,040,611 | A | | 8/1991 | Steel |
| 5,199,423 | A | * | 4/1993 | Harral et al. .......... 128/202.26 |
| 5,735,934 | A | * | 4/1998 | Spears .......... 75/414 |
| 5,845,714 | A | | 12/1998 | Sundholm |
| 5,918,680 | A | | 7/1999 | Maranghides |
| 5,957,210 | A | * | 9/1999 | Cohrt et al. .......... 169/44 |
| 6,003,608 | A | | 12/1999 | Cunningham |
| 6,418,752 | B2 | * | 7/2002 | Kotliar .......... 62/640 |

* cited by examiner

Primary Examiner—Robin O. Evans
(74) Attorney, Agent, or Firm—Young & Thompson

(57) ABSTRACT

This process comprises a phase for detecting (26) the presence of the fire, as well as a phase for extinguishing this fire, comprising a phase of projecting (by 24), into the compartment (16), an extinguishing fluid, in particular water, as well as a phase of generating (by 2) air enriched in inert gas, from a source (5) of compressed air internal to the airplane, and a phase of admitting (by 10 and 12) at least a portion of this enriched air into the compartment (16).

16 Claims, 1 Drawing Sheet

Figure 1:
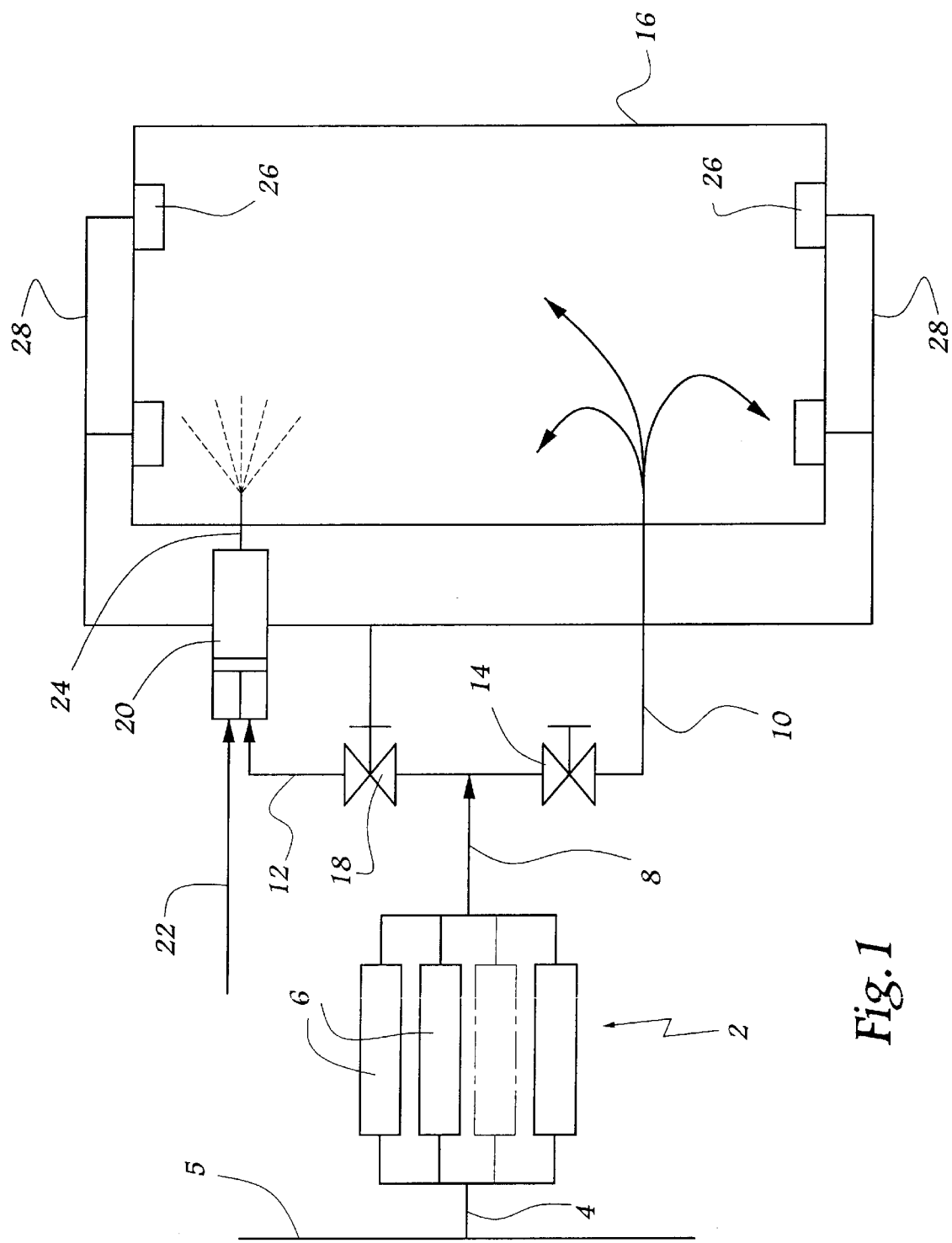

PROCESS AND INSTALLATION FOR FIGHTING A FIRE IN AN AIRCRAFT COMPARTMENT AND AIRCRAFT EQUIPPED WITH SUCH AN INSTALLATION

The present invention relates to a process and device for fighting a fire in an airplane compartment.

The invention relates not only to civil aviation for the transport of passengers, but also to aviation for the transportation of freight, as well as military aviation. It relates to the protection, from fire, of compartments adapted to receive baggage or material, such as airplane compartments, or else electronic bays, which contain the electrical interfaces of the airplane.

When a fire breaks out in such a compartment, in flight, it is necessary to contain it rapidly, so that the airplane can proceed to its destination, without the physical integrity of the passengers and of the equipment being endangered.

To this end, it is known to provide the compartment which it is desired to protect, with detectors adapted to detect, either the smoke from the fire, or the temperature increase connected to combustion. In the case of fire, these detectors generate an alarm signal, which is transmitted to the pilot. The latter then initiates the operation of a fire extinguisher which comprises, in the known state of the art, several cylinders containing an extinguishing agent under pressure, sold under the name "Halon 1301".

When the pilot activates the extinguishing device, the extinguishing agent is vaporized in the compartment, by means of distribution lines, ending in nozzles opening into the mentioned compartment. It is a matter then of obtaining a concentration of the extinguishing agent in the air of the compartment, which will be comprised between 3 and 5%.

Then, during the rest of the flight, a continuous flow, at a lower rate, of extinguishing agent is continuously admitted into the compartment. Such a measure permits compensating any possible loss connected with the existing escape into the airplane.

This known solution however has certain drawbacks.

Thus, although the extinguishing agent used has a good capability of protecting against fire, and has only a low toxic risk, because it is used at low concentrations, it endangers the stratosphere of ozone layer.

Moreover, the duration of protection of the compartment depends directly on the volume of extinguishing agent employed. It is therefore not possible to ensure, in this way, a sufficient degree of safety for flights of very long duration, requiring long rerouting times, for example of eight hours. This would thus involve the taking onboard of a considerable volume of extinguishing agent, which would be unacceptable because of its weight and its size.

So as to overcome these various drawbacks, the invention proposes practicing a process which, whilst ensuring reliable control of a fire, over a long period of time, will not be detectably dangerous to the environment, in particular as to the destruction of the ozone layer and the greenhouse effect.

To this end, it has for its object a process for fighting fire in an airplane compartment, comprising a phase of detecting the presence of the fire, and a phase of extinguishing this fire, characterized in that the extinguishing phase comprises a phase of projection, into the compartment, of an extinguishing fluid, as well as a phase of generating air enriched in inert gas, from a source of compressed air within the aircraft, and a phase of admission of at least one portion of this enriched air into the compartment.

The projection of the extinguishing fluid, which is preferably water-based, permits lowering immediately the temperature prevailing in the compartment affected by the fire. This projection thus guarantees an instantaneous action on the fire, which contributes to controlling it effectively.

Moreover, the admission of air enriched in inert gas, principally in nitrogen, and hence impoverished in oxygen, ensures the maintenance of a low concentration of oxygen in the compartment, which is sufficiently low to prevent fire, once controlled by the projection of the extinguishing fluid, from propagating into the rest of the compartment.

Given that air enriched in inert gas is produced continuously from compressed air within the airplane, this enriched air is available for a time equal to that of the flight, such that rendering the compartment inert can be ensured during as long a light as is desired. The process of the invention thus provides a substantial advantage relative to the prior art, in which the onboard extinguishing agent is available only in a predetermined quantity.

Moreover, the process of the invention requires substantially no maintenance, contrary to the storage system of the prior art requiring frequent verification, or else periodic refilling.

The extinguishing device of the invention has a reduced weight and size, such that it does not substantially decrease the available volume for baggage that may be stored in the compartment.

To this end, it should be noted that, although it is envisagable to fight the fire solely by means of a liquid, such as water, such a solution would be unacceptable, given that it would have to use a considerable volume of this liquid.

Finally, the invention permits use of extinguishing and inerting agents which have substantially no impact on the environment, in particular on the ozone layer and the greenhouse effect.

According to other characteristics of the invention:
- the air enriched in inert gas has an inert gas content comprised between 84 and 95%, preferably between 88 and 91%;
- the extinguishing fluid is a liquid which is projected in atomized form into the compartment, by means of a gas under pressure;
- the liquid contains water and the inert gas is comprised essentially of nitrogen.

The invention also has for its object an installation for fighting a fire in an airplane compartment, comprising means for detecting the presence of the fire, the means for extinguishing this fire, in which the extinguishing means comprise means for projecting, within said compartment, an extinguishing fluid, means for generating air enriched in inert gas, from a source of compressed air carried by the airplane, and means for admitting at least a portion of this enriched air to the interior of the compartment.

The invention also has for its object an aircraft provided with such an installation.

The invention will be described hereafter, with reference to the attached single FIGURE, given solely by way of non-limiting example, this FIGURE being a schematic view showing a device for fighting a fire, according to the invention.

The extinguishing device shown in the FIGURE comprises a separating apparatus 2, permitting generating air enriched in inert gas. This apparatus is connected by a line 4 with a source 5 of compressed air, internal to an airplane. Such a source is for example comprised by the air conditioning circuit of the airplane, or else by removal at the level of the compression stages of the motors of the latter.

The separating apparatus 2, of known type, is for example like those sold by the company L'AIR LIQUIDE. It uses several permeation membranes 6, disposed in parallel, with reference to the flow of the air which circulates therethrough.

By way of modification, the air enriched in inert gas can be produced by means of a separating apparatus using molecular adsorption sieves. In this case, it is for example like one of those sold by the LITTON company.

The outlet of the apparatus 2, which is comprised by a conduit 8, permits bringing air, whose nitrogen content is comprised between about 84 and 95%, typically between 88 and 91%, whilst its oxygen content is below 12%, typically comprised between 9 and 12%, to a pressure not exceeding 5 bars and with a flow rate of the order of several liters per minute. This conduit 8 is placed in communication with two branch lines 10, 12. The first line 10, which is provided with a valve 14, opens into a compartment of the airplane, which is for example a storage compartment 16.

Moreover, the second line 12, which is provided with a valve 18, is in communication with a reservoir 20 containing an extinguishing fluid, which is water in the example that is described and illustrated. This reservoir is also supplied, by a conduit 22, with air under pressure. A line 24, forming the outlet of the reservoir 20, opens within the storage compartment 16 and is provided at its end opposite the reservoir 20 with atomizing nozzles (not shown).

The walls of the compartment 16 are provided with detectors 26, which communicate via conduits 28 with the valve 18 for controlling air enriched in inert gas, flowing in the line 12. These detectors, of known type, are adapted to detect the smoke produced by a fire, or else the increase of temperature resulting from this latter.

The operation of the device for fighting a fire, described above, will now be explained.

When a fire breaks out, the detectors 26 signal its existence to the pilot. The latter then initiates the projection by spraying, within the compartment 16, of the water contained in the reservoir 20. Such a projection is, at least in a first instance, ensured by means of the air under pressure conveyed by the conduit 22. It is to be noted that the admission of this water can be caused automatically, upon actuation of the detectors.

Moreover, the apparatus 2 is started, either by the pilot, or automatically. Air enriched in inert gas, principally in nitrogen, but also in argon, is then admitted within the compartment, via the conduit 8 and the line 10. This air enriched in inert gas can also be conveyed by the line 12, in the direction of the reservoir 20. It thus contributes to the atomization of the water contained in the reservoir 20, supplementing, or even replacing, the air under pressure circulating in the conduit 22 and coming itself also from the motors.

The water introduced by the line 24 permits partially extinguishing the flames or nearby ignition points, and lowering immediately the temperature prevailing in the compartment 16. Moreover, the air enriched in inert gas, admitted into the compartment 16 by the line 20 and spreading throughout the compartment, contributes to maintaining therein a sufficiently low concentration of oxygen to prevent the fire from spreading and/or propagating in the compartment 16.

The invention is not limited to the examples described and shown. Thus, the extinguishing fluid could be a liquid other than water, or else an inert gas, such as nitrogen, argon, carbon dioxide, or mixtures of these gases, stored at a very high pressure, then expanded and introduced into the compartment that it is desired to protect.

The quantity of extinguishing fluid delivered, the time of distribution of this latter, as well as the flow rate of air that is injected that is enriched in nitrogen, depend on different parameters. It is a matter among other things of the dimensions of the compartment, of the pressure of the available air, as well as the number of modules for air separation.

It is possible to perform a principal step of distribution of the extinguishing fluid, immediately after activation of the detectors, then to proceed to supplemental distribution over a shorter time. Moreover, the admission of air enriched in inert gas is preferably continued during all the duration of the flight, until the apparatus lands.

Although the invention has been described with respect to particular embodiments, it is also applicable to other types of transport vehicles, terrestrial or naval.

What is claimed is:

1. Process for fighting a fire in an airplane compartment (16), comprising a detection phase (by 26) of the presence of the fire, and a phase of extinguishing this fire, characterized in that the extinguishing phase comprises a projection phase (by 24), into the compartment (16), of an extinguishing fluid, as well as a phase of generating (by 2) air enriched in inert gas, from a source (5) of compressed air internal to the airplane, and a phase of admission (via 10) of at least a portion or this enriched air into the compartment (16).

2. Process according to claim 1, characterized in that the air enriched in inert gas is generated by causing said compressed air to circulate through permeable membranes (6).

3. Process according to claim 1, characterized in that the air enriched in inert gas is generated by causing the compressed air to circulate through molecular sieves.

4. Process according to claim 1, characterized in that the air enriched in inert gas has an inert gas content comprised between 84 and 95%, preferably between 88 and 91%.

5. Process according to claim 1, characterized in that there is admitted into the compartment substantially all said air enriched in inert gas.

6. Process according to claim 1, characterized in that the extinguishing fluid is a liquid and that this extinguishing liquid is projected in atomized form into the compartment (16) by means of a gas under pressure.

7. Process according to claim 6, characterized in that the extinguishing fluid is water.

8. Process according to claim 6, characterized in that there is used a fraction of said air enriched in inert gas, so as to project said extinguishing liquid in atomized form.

9. Installation for fighting a fire in an airplane compartment (16), comprising means (26) for detecting the presence of said fire, and means (10, 20, 24) for extinguishing this fire, characterized in that the extinguishing means comprise means (20, 24), for projecting within said compartment (16) an extinguishing fluid, means (2) for generating air enriched in inert gas, from a source (5) of compressed air internal to the airplane, and means (8, 10) for admitting at least a portion of this enriched air to the interior of the compartment (16).

10. Installation according to claim 9, characterized in that the generation means comprise a separation apparatus (2) with permeable membranes (6).

11. Installation according to claim 9, characterized in that the generation means comprise a separation apparatus with molecular sieves.

12. Installation according to claim 9, characterized in that the projection means comprise a reservoir (20) containing the extinguishing fluid, and a supply line (24) extending from the reservoir and opening into the compartment (16).

13. Installation according to claim 12, characterized in that the reservoir (20) is placed in communication with at least one supply means (12, 22) for a gas under pressure.

14. Installation according to claim 13, characterized in that at least one supply means (12) is connected to the means (2) for generating air enriched in inert gas.

15. Installation according to claim 12, characterized in that the reservoir (20) contains water.

16. Aircraft provided with an installation according to claim 9.

* * * * *